United States Patent
Winkler

(10) Patent No.: US 7,602,314 B2
(45) Date of Patent: Oct. 13, 2009

(54) METHOD AND DEVICE FOR ASSISTING IN THE PILOTING OF AN AIRCRAFT IN FREE FLIGHT

(75) Inventor: Falk Winkler, Cintegabelle (FR)

(73) Assignee: AIRBUS France, Toulouse (FR)

( * ) Notice: Subject to any disclaimer, the term of this patent is extended or adjusted under 35 U.S.C. 154(b) by 283 days.

(21) Appl. No.: 11/648,910

(22) Filed: Jan. 3, 2007

(65) Prior Publication Data

US 2007/0182591 A1 Aug. 9, 2007

(30) Foreign Application Priority Data

Jan. 5, 2006 (FR) .................................. 06 00070

(51) Int. Cl.
*G01C 21/00* (2006.01)
(52) U.S. Cl. ...................................... 340/971
(58) Field of Classification Search ................ 340/971, 340/967, 970, 977; 701/301, 3, 7, 18
See application file for complete search history.

(56) References Cited

U.S. PATENT DOCUMENTS

| 5,445,021 | A | | 8/1995 | Cattoen et al. | |
|---|---|---|---|---|---|
| 6,088,654 | A | * | 7/2000 | Lepere et al. | ............... 701/301 |
| 6,690,298 | B1 | * | 2/2004 | Barber et al. | ............... 340/971 |
| 6,720,891 | B2 | * | 4/2004 | Chen et al. | ................... 340/969 |
| 2002/0143439 | A1 | * | 10/2002 | Morizet et al. | ................... 701/3 |
| 2003/0107499 | A1 | | 6/2003 | Lepere et al. | |
| 2005/0261811 | A1 | | 11/2005 | Artini et al. | |
| 2006/0250280 | A1 | * | 11/2006 | Chen et al. | ................... 340/974 |

FOREIGN PATENT DOCUMENTS

| FR | 2773609 | 7/1999 |
|---|---|---|
| FR | 2813963 | 3/2002 |
| FR | 2822944 | 10/2002 |
| FR | 2870604 | 11/2005 |

OTHER PUBLICATIONS

Preliminary Search Report with English translation dated Nov. 22, 2006.

* cited by examiner

*Primary Examiner*—Phung Nguyen
(74) *Attorney, Agent, or Firm*—Dickinson Wright, PLLC

(57) ABSTRACT

A device to assist in the piloting of an aircraft in free flight includes a display unit to present, in a display window of a screen, an information presentation illustrating a vertical plane and which is formed so as to position the display window altitude-wise, and to further position a symbol illustrating the aircraft vertically in the display window, where the positioning of the display window and the symbol are based on the current flight phase, the current altitude and the current value of a particular vertical parameter of the aircraft.

9 Claims, 3 Drawing Sheets

METHOD AND DEVICE FOR ASSISTING IN THE PILOTING OF AN AIRCRAFT IN FREE FLIGHT

FIELD OF INVENTION

The present invention relates to a method and a device for assisting in the piloting of an aircraft, in particular of a military transport airplane, which is in free flight, that is, which is not following any flight plan.

BACKGROUND OF THE RELATED ART

Patents FR-2 689 231 and FR-2 822 944 disclose methods for assisting in piloting, according to which there is presented, on a display screen of said aircraft, an information presentation which illustrates a vertical plane along a flight path representative of a predetermined flight plan of said aircraft and which comprises:
- a system of axes, of which a y-axis is graduated altitude-wise, and an x-axis is graduated distance-wise from the position of the aircraft;
- a characteristic symbol representing the aircraft, which is positioned on said y-axis in a position representative of the altitude of said aircraft; and
- at least one first trace representing the vertical path of said flight path, and a second trace representing the profile of the ground being flown over.

Such a known method is above all used in the civilian domain. Furthermore, it relates only to a flight that is made according to a flight plan (along a flight path conforming to said flight plan).

It is known that a civilian flight as performed in the civilian domain has a particular profile (or a series of phases), namely a climb to a maximum cruising altitude (which is sometimes reached via a number of stages), a flight at that altitude, then a descent to the destination altitude. Thus, once the climb has begun, it is continued to the maximum cruising altitude. Similarly, once the descent has begun, it is continued to the destination, and without an intermediate climb being required during this descent.

Such a civilian flight therefore has long climb and descent phases. Generally, the positioning of the abovementioned particular symbol (representing the aircraft) on the y-axis of said system of axes is achieved according to either the selected altitude or the destination altitude.

It will be noted that the present invention is applied more particularly, although not exclusively, to a tactical flight, that is a flight made generally in the military domain and which includes at least one tactical event such as an in-flight refueling, an initially unplanned landing, a jettisoning or a parachuting of troops and/or of equipment, for example. Such a tactical flight has a profile that overall can include several high-altitude flight phases and several low-altitude flight phases. A typical profile of such a tactical flight can, for example, include the following phases: a take-off phase with a climb, a transit to high altitude, a rapid descent to a low-altitude flight zone likely to be dangerous, and in which a tactical event can be performed, such as a jettisoning, for example, then a repeat transit to high altitude, for example to perform an in-flight refueling, and finally a descent to the final destination.

Such a profile therefore includes not only long climb and descent phases, like a civilian profile, but also automatic ground-following paths resulting in short climbs and descents, and including connecting phases between a descent and a flight at low altitude or between a flight at low altitude and a climb.

Because of these latter characteristics, the usual abovementioned information presentation (relating to the vertical plane along the flight plan of the aircraft), which is well suited to a civilian flight, is not totally satisfactory for a tactical flight. In practice, using this usual information presentation as such risks showing up jumps in the position both of the display window and (above all) of said particular symbol representing the aircraft, in transitions from one flight phase to another. Also, with such a usual information presentation, it will be very difficult for the pilot to effectively monitor the future path in all the flight phases likely to be followed by the aircraft.

Furthermore, this usual information presentation is not applicable to a free flight as considered in the present invention, that is, a flight with no flight plan, since this information presentation is produced by definition along a flight path which is representative of the flight plan being followed.

SUMMARY OF THE INVENTION

The present invention relates to a method for assisting the piloting of an aircraft in free flight, in particular of a military transport airplane, which makes it possible to overcome the abovementioned drawbacks.

To this end, said method wherein there is presented, on at least one display window of at least one display screen of said aircraft, an information presentation which illustrates a vertical plane and which comprises:
- a system of axes, of which a y-axis is graduated altitude-wise, and an x-axis is graduated distance-wise from the position of the aircraft;
- a characteristic symbol representing the aircraft, which is positioned on said y-axis in a position representative of the altitude of said aircraft; and
- a trace representing a profile of the ground being flown over and revealing a vertical section, is noteworthy, according to the invention, in that, during a flight of the aircraft, the following series of steps is carried out automatically and successively:
  a) the current flight phase of the aircraft is determined;
  b) the current altitude of the aircraft is determined;
  c) the current value of a particular parameter of the aircraft, which illustrates a vertical characteristic of the latter, is determined;
  d) based on said current flight phase, said current altitude and said current value of said particular parameter, there are determined:
   - a reference height corresponding to a height of said characteristic symbol in said display window; and
   - a reference altitude corresponding to the altitude of the lowest point of the vertical section displayed; and
  e) the following are positioned:
   - said display window, altitude-wise such that the lowest point of the vertical section displayed in said display window is located at said reference altitude on said y-axis graduated altitude-wise; and
   - said characteristic symbol, vertically in said display window at a height corresponding to said reference height.

Thus, with the invention, the positioning altitude-wise of the display window, and the positioning of the characteristic symbol representing the aircraft in this display window depend on the current flight phase, the current altitude, and the current value of said particular parameter (which illustrates a vertical characteristic of the aircraft and which will be specified below). Consequently, as specified below, said information presentation always shows the space that is located in the direction in which the aircraft is flying, which has the particular advantage of never allowing the monitoring of the ground to be lost in transitional phases, between a climb and a descent for example. The present invention thus makes it possible to optimize the monitoring of the upcoming flight path, and this regardless of the flight phase of the aircraft. Furthermore, the transitions from one phase to another are continuous, with no jump in the position either of the display window, or (above all) of said characteristic symbol.

In a first preferred embodiment, said particular parameter is the flight-path angle of the aircraft which corresponds to the angle between the speed vector of the aircraft and the horizontal.

In this first embodiment, advantageously, in a flight phase corresponding to one of the following phases: an approach phase, a go-around phase, and a low-altitude flight phase, in the step d):

if said current flight-path angle FPA (that is, the current value of said flight-path angle) is greater than or equal to zero, there are determined:
  as reference height Zac, the maximum value between Z2 and Z0/2−B.FPA.Z0, Z0 being the useful height of the display window, Z2 being the height of a lower area of exclusion from display of said characteristic symbol in said display window, and B being a coefficient; and
  as reference altitude, an altitude ALTref satisfying the relation ALTref=ALTac−Zac, ALTac being said current altitude of the aircraft; and if said current flight-path angle FPA is less than zero, there are determined:
  as reference height Zac, the minimum value between Z1 and Z0/2−C.FPA.Z0, Z1 being the difference between said useful height and the height of an upper area of exclusion from display of said characteristic symbol in said display window, and C being a coefficient; and
  as reference altitude, an altitude ALTref satisfying the relation ALTref=ALTac−Zac.

Preferably, the coefficients B and C (which, in a preferred embodiment described below, depend in particular on the vertical speed) are different. This makes it possible to optimize in a different way the area covered by the display window depending on whether the aircraft is flying in a descent or climbing mode. In practice, an aircraft normally descends more rapidly than it climbs. (that is, the vertical descent speed is greater than the vertical climb speed).

Furthermore, advantageously, in a flight phase corresponding to one of the following phases: a take-off phase, a climbing phase and a pre-flight phase, there are determined in step d):

as reference height, a height Z2 which corresponds to the height of a lower area of exclusion from display of said characteristic symbol in said display window; and
as reference altitude, an altitude ALTref satisfying the relation ALTref=ALTac−Z2, ALTac being said current altitude of the aircraft.

Furthermore, advantageously, in a flight phase corresponding to a descent phase, there are determined in step d):
as reference height, a height Z1 which is the difference between a useful height of said display window and the height of an upper area of exclusion from display of said characteristic symbol in said display window; and
as reference altitude, an altitude ALTref satisfying the relation ALTref=ALTac−Z1, ALTac being said current altitude of the aircraft.

It will be noted that, preferably:

$Z1=7\,Z0/8$; and $Z2=Z0/8$.

Moreover, in a second embodiment, said particular parameter is the vertical speed of the aircraft.

It will be noted that the ground shown via said trace is in the current axis of the flight, that is, in the current route of the aircraft.

The present invention also relates to a device for assisting in the piloting of an aircraft, in particular of a military transport airplane, which is in free flight.

According to the invention, said device of the type comprising display means that can show, on at least one display window of at least one display screen of said aircraft, an information presentation which illustrates a vertical plane and which comprises:
  a system of axes, of which a y-axis is graduated altitude-wise, and an x-axis is graduated distance-wise from the position of the aircraft;
  a characteristic symbol representing the aircraft, which is placed on said y-axis in a position representative of the altitude of said aircraft; and
  a trace representing a profile of the ground being flown over and revealing a vertical section, is noteworthy in that:
  said device also comprises:
    a first means for determining the current flight phase of the aircraft;
    a second means for determining the current altitude of the aircraft;
    a third means for determining the current value of a particular parameter of the aircraft, which illustrates a vertical characteristic of the latter; and
    a fourth means for determining, from said current flight phase, said current altitude and said current value of said particular parameter:
      a reference height corresponding to a height of said characteristic symbol in said display window; and
      a reference altitude corresponding to the altitude of the lowest point of the vertical section displayed; and
  said display means are formed so as to position:
    said display window altitude-wise such that the lowest point of the vertical part displayed in said display window is located at said reference altitude on said y-axis graduated altitude-wise; and
    said characteristic symbol vertically in said display window at a height corresponding to said reference height.

Thus, said device according to the invention makes it possible to avoid any discontinuity in the position of said characteristic symbol and in that of said display window.

BRIEF DESCRIPTION OF THE DRAWINGS

The figures of the appended drawing will clearly show how the invention can be implemented. In these figures, identical references denote similar items.

DETAILED DESCRIPTION OF THE INVENTION

Figure 1:
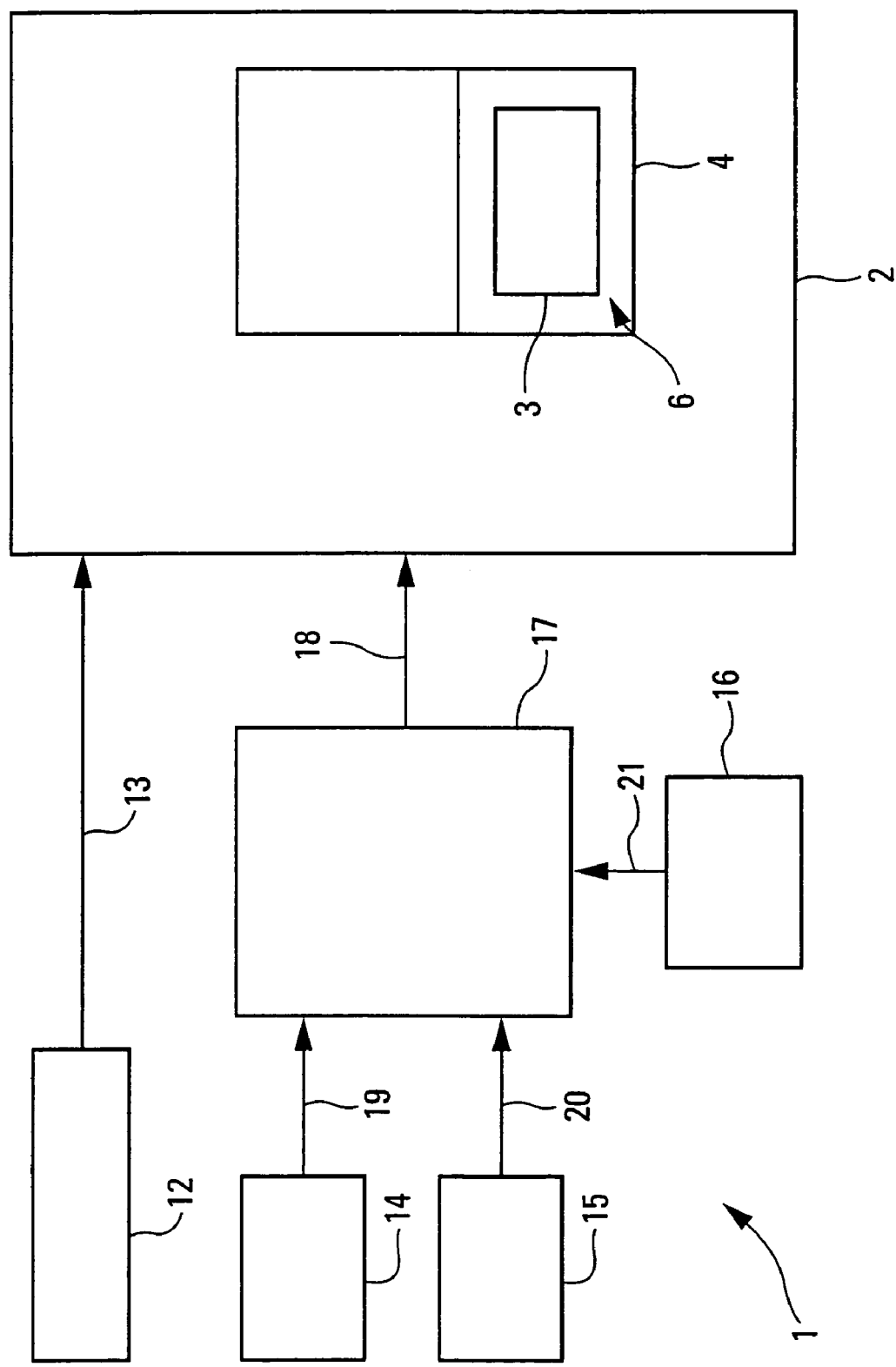
FIG. 1 is the block diagram of an assistance device according to the invention.

The device 1 according to the invention and diagrammatically represented in FIG. 1 is intended to assist operators (pilot, co-pilot, etc.) of an aircraft (not shown), in the piloting of said aircraft, for example a military transport airplane. Within the context of the present invention, said aircraft is in free flight, that is, it is not following any flight plan.

For this, said assistance device 1 which is on board the aircraft, comprises display means 2 which can show, on a display window 3 of a usual display screen 4, an information presentation 5 detailed below. Said display window 3 can be represented on a part 6 of the display screen 4, for example a lower part of the latter. It can also be represented over all of said display screen 4.

Figure 2:
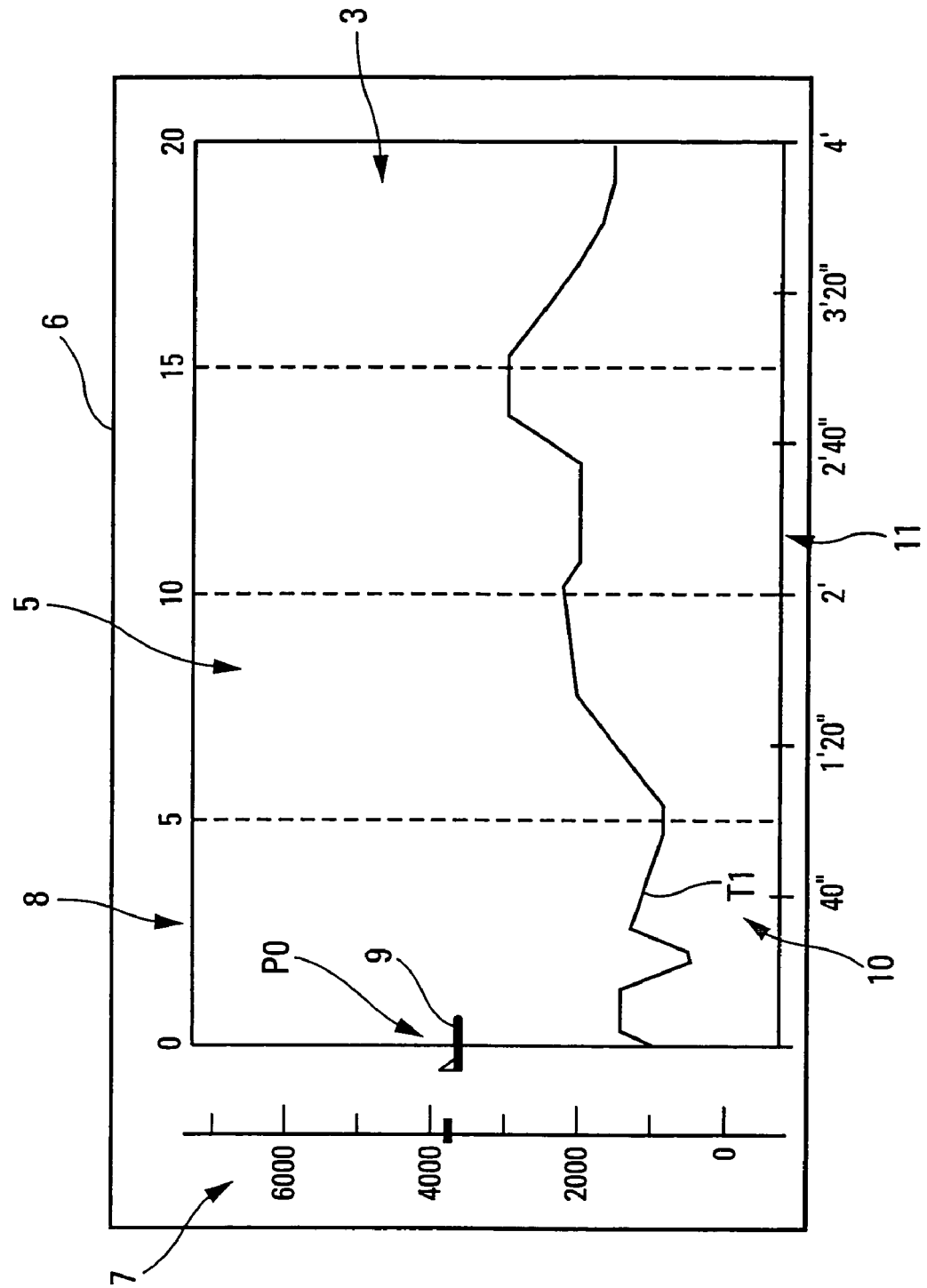
FIG. 2 diagrammatically shows a display window of an assistance device according to the invention.

Said information presentation 5 illustrates a vertical plane and comprises, as represented in FIG. 2:
- a system of axes, of which a y-axis 7 is graduated altitude-wise, preferably expressed in feet (a foot being approximately 0.3 meters), and an x-axis 8 is graduated distance-wise from the position of the aircraft illustrated by a characteristic symbol 9, said distance preferably being expressed in nautical miles NM (a nautical mile being approximately 1852 meters);
- said characteristic symbol 9 which represents the aircraft and which is placed on said y-axis 7 in a position P0 representative of the altitude of said aircraft; and
- a trace T1 representing the profile of the ground being flown over and revealing a vertical section 10. According to the invention, said trace T1 is formed along the current route of the aircraft.

Said device 1 can also include a set 12 of information sources, which is linked via a link 13 to said display means 2. Said set 12 of information sources can in particular comprise the following means which are not detailed any further:
- a central acquisition and information processing unit, for example a flight management system (FMS); and
- usual information sources such as navigation instruments and sensors giving information on the state and position of the aircraft for example.

It will be noted that the device 1 according to the invention can be used more particularly, although not exclusively, in a tactical flight, that is, in a flight that is normally implemented in the military field and which includes at least one tactical event such as an in-flight refueling, an initially unplanned landing, a jettisoning or a parachuting of troops and/or equipment for example. Such a tactical flight has a profile which, overall, can include several high-altitude flight phases and several low-altitude flight phases.

Also, the device 1 according to the invention which is intended for a tactical flight must be optimized not only for long climb and descent phases, but also for automatic ground-following paths leading to climbs and descents, in the phases connecting a descent and a low-altitude flight and connecting a low-altitude flight and a climb.

In order to be able in particular to be used in such a tactical flight which can therefore include several short high-altitude flight phases and low-altitude flight phases, said device 1 comprises, in addition, according to the invention:
- a usual means 14, for determining the current flight phase (climbing phase, cruising phase, low-altitude flight phase, etc.) of the aircraft;
- a usual means 15, for determining an altitude ALTac corresponding to the current altitude of the aircraft;
- a means 16 for determining the current value of a particular parameter of the aircraft. This particular parameter (specified below) illustrates a vertical characteristic of the aircraft; and
- a means 17 which is linked via links 18, 19, 20 and 21 respectively to said means 2, 14, 15 and 16, and which is formed so as to determine, from said current flight phase, from said altitude ALTac and from said current value of said particular parameter, respectively received from said means 14, 15 and 16, and in the manner specified below:
  - a reference height Zac (which corresponds to a height of said characteristic symbol 9 in said display window 3); and
  - a reference altitude ALTref (which corresponds to the altitude of the lowest point of the vertical section 10 displayed).

Figure 3:
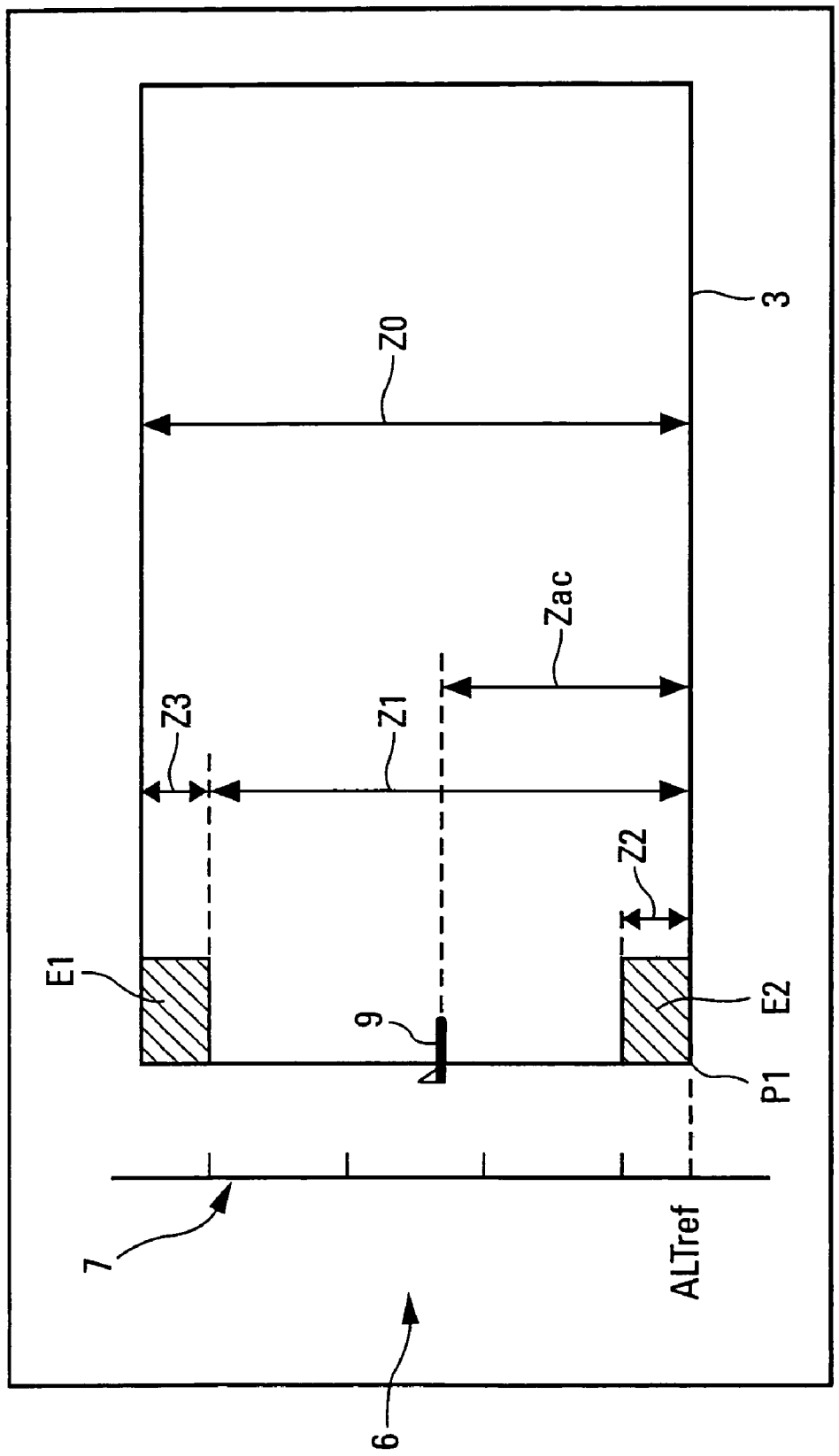
FIG. 3 diagrammatically illustrates a display window, on which are shown various parameters used to implement the present invention.

Furthermore, according to the invention, said display means 2 are formed so as to position, as represented in FIG. 3:
- said display window 3 altitude-wise such that the lowest point P1 of the vertical section 10 displayed in said display window 3 is located at said reference altitude ALTref (calculated by said means 17) on said y-axis 7 graduated altitude-wise; and
- said characteristic symbol 9 vertically in said display window 3 in order to bring it in said display window 3 to a height corresponding to said reference height Zac (calculated by said means 17).

Thus, with the device 1 according to the invention, the positioning altitude-wise of the display window 3, and the positioning of the characteristic symbol 9 in this display window 3, depend on the current flight phase, on said altitude ALTac and on the current value of said particular parameter. Consequently, said information presentation 5 always shows the space that is located in the direction in which the aircraft is flying, which has the particular advantage of never losing the monitoring of the ground in transitional phases, between a climb and a descent for example. This characteristic makes it possible to optimize the monitoring of the future flight path, and this regardless of the flight phase of the aircraft. Furthermore, the transitions from one phase to another are continuous, without any jump in position of the display window 3, or (above all) of said characteristic symbol 9.

In a particular embodiment, said means 14 and 15 can be incorporated in said set 12 of information sources and said means 16 and 17 can be part of said display means 2.

In the context of the present invention, said means 16 can determine the current value of different particular parameters which illustrate at all times a vertical characteristic of the aircraft, and in particular the current value of the vertical speed of said aircraft. However, in a preferred embodiment, said means 16 takes into account, as particular parameter, the flight-path angle of the aircraft, that is, the angle between the speed vector of said aircraft and the horizontal. The following description relates to this preferred embodiment therefore using the current flight-path angle FPA of the aircraft.

It will be noted that, in a particular embodiment, the information presentation 5 according to the invention can also include an x-axis 11 which is graduated time-wise, expressed in seconds and in minutes. Thus, as an example, 1'20" corresponds to 1 minute and 20 seconds of flight. This time scale is determined for a particular speed of the aircraft, for example for a standard speed of 300 kt (or knots, 1 knot being approximately 0.5 m/s) in climbing mode and 240 kt in descent mode.

To clearly explain the characteristics of the present invention, account is taken of the following heights, relative to the display window 3, which are represented in FIG. 3:

Z0 which is the useful height of the display window 3, that is, the overall height of the part of the space (ground and sky) displayed in this display window 3;

Z1 which corresponds to the difference between said useful height Z0 and the height Z3 of an upper area E1 of display exclusion, in which said characteristic symbol 9 cannot be displayed. Preferably, the height Z3 is equal to Z0/8 such that the height Z1 is then equal to 7Z0/8; and Z2 which is the height of a lower area E2 of display exclusion, in which said characteristic symbol 9 cannot be displayed. Preferably, the height Z2 is equal to Z0/8.

In a preferred embodiment, in a flight phase corresponding to one of the following phases: an approach phase, a go-around phase and a low-altitude flight phase:

if said current flight-path angle FPA (which therefore corresponds to the current value of the flight path angle of the aircraft, which is used as particular parameter) is greater than or equal to zero (that is, climbing or in horizontal flight), said means 17 determines:

as reference height Zac, the maximum value between Z2 and Z0/2−B.FPA.Z0, B being a coefficient specified below; and as reference altitude, an altitude ALTref satisfying the relation ALTref=ALTac−Zac, ALTac being said current altitude of the aircraft; and if said current flight-path angle FPA is less than zero (that is in descent), said means 17 determines:

as reference height Zac, the minimum value between Z1 and Z0/2−C.FPA.Z0, C being a coefficient detailed below; and as reference altitude, an altitude ALTref satisfying the relation ALTref=ALTac−Zac.

Preferably, the coefficients B and C are different. This makes it possible to optimize in a different way the area covered by the display window 3 according to whether the aircraft is flying in descent mode or in climbing mode. In practice, an aircraft normally descends more rapidly than it climbs, that is, the vertical descent speed is greater than the vertical climbing speed.

According to the invention, said coefficients B and C satisfy the following relations:

$$\begin{cases} B = (3/8) \cdot B1 \\ C = (3/8) \cdot C1 \end{cases}$$

in which:

$$B1 = arctg(VZ1/V1.A1)$$

with:

arctg being the inverse of the tangent,

VZ1 being the vertical speed of the aircraft,

V1 being the longitudinal speed of the aircraft, and

A1 being a matching coefficient which is equal to 6080 if VZ1 is expressed in ft/min (feet per minute) and V1 is expressed in NM/min (nautical miles per minute); and $$C1 = arctg(VZ2/V2.A2)$$

with:

VZ2 being the vertical speed of the aircraft,

V2 being the longitudinal speed of the aircraft, and

A2 being a matching coefficient which is also equal to 6080 if VZ2 is expressed in ft/min and V2 is expressed in NM/min.

In a preferred embodiment, it is desirable to optimize the information presentation 5:

for a descent of 2500 ft/min (or feet per minute, 1 foot being approximately 30 centimeters) at 300 kt (or knots, 1 knot being approximately 0.5 m/s); and for a climb at 2000 ft/min at 240 kt.

Consequently, since at 300 kt the aircraft travels 5 NM per minute, the coefficient B1 is equal to:

$$B1 = arctg(2500/5.6080) = 4.7°.$$

Furthermore, during a climb at a speed equal to or greater than 240 kt, the aircraft travels at least 4 NM per minute, at a vertical speed of 2800 ft/min initially. In this case, the coefficient C1 is therefore equal to:

$$C1 = arctg(2800/4.6080) = 6.56°.$$

Moreover, in a flight phase corresponding to one of the following phases: a take-off phase, a climbing phase and a pre-flight phase, said means 17 determines:

as reference height Zac, said height Z2; and as reference altitude ALTref, an altitude satisfying the relation ALTref=ALTac−Z2.

Furthermore, in a flight phase corresponding to a descent phase, said means 17 determines:

as reference height Zac, said height Z1 which therefore corresponds to the difference between the useful height Z0 of the display window 3 and the height Z3 of the upper area E1 of display exclusion; and as reference altitude ALTref, an altitude satisfying the relation ALTref=ALTac−Z1.

Consequently, the device 1 according to the invention makes it possible to avoid any discontinuity in the position of said characteristic symbol 9 and in that of said display window 3.

The invention claimed is:

1. A method of assisting in piloting of an aircraft in free flight, wherein there is presented, on at least one display window of at least one display screen of said aircraft, an information presentation which illustrates a vertical plane and which comprises:

a system of axes, of which a y-axis is graduated altitude-wise, and an x-axis is graduated distance-wise from a position of the aircraft;

a characteristic symbol representing the aircraft, which is positioned on said y-axis in a position representative of an altitude of said aircraft; and a trace representing a profile of the ground being flown over and revealing a vertical section, wherein, during a flight of the aircraft, the following series of steps is carried out automatically and successively:

a) determining a current flight phase of the aircraft;

b) determining a current altitude of the aircraft;

c) determining a current value of a particular parameter of the aircraft, which illustrates a vertical characteristic of the latter;

d) determining, based on said current flight phase, said current altitude and said current value of said particular parameter:

a reference height Zac corresponding to a height of said characteristic symbol in said display window; and a reference altitude ALTref corresponding to an altitude of a lowest point of the vertical section displayed; and e) positioning:
  said display window, altitude-wise such that the lowest point of the vertical section displayed in said display window is located at said reference altitude ALTref on said y-axis graduated altitude-wise; and
  said characteristic symbol, vertically in said display window at a height corresponding to said reference height Zac, wherein the free flight of the aircraft comprises a flight path which is not predetermined.

2. The method as claimed in claim 1, wherein said particular parameter is a flight-path angle of the aircraft which corresponds to an angle between a speed vector of the aircraft and the horizontal.

3. The method as claimed 2, in claim wherein, in a flight phase corresponding to one of the following phases: an approach phase, a go-around phase, and a low-altitude flight phase, step d) includes:
  if said current flight-path angle FPA is greater than or equal to zero, determining:
    the reference height Zac, having a maximum value between Z2 and Z0/2-B.FPA.Z0, Z0 being a useful height of the display window, Z2 being a height of a lower area of exclusion from display of said characteristic symbol in said display window, and B being a coefficient; and
    the reference altitude, having the altitude ALTref satisfying the relation ALTref=ALTac-Zac, ALTac being said current altitude of the aircraft; and
  if said current flight-path angle FPA is less than zero, there are determined:
    the reference height Zac, having a minimum value between Z1 and Z0/2-C.FPA.Z0, Z1 being a difference between said useful height and the height of an upper area of exclusion from display of said characteristic symbol in said display window, and C being a coefficient; and
    the reference altitude, having an altitude ALTref satisfying the relation ALTref=ALTac-Zac.

4. The method as claimed in claim 2, wherein, in a flight phase corresponding to one of the following phases: a take-off phase, a climbing phase and a pre-flight phase, step d) includes determining:
  the reference height Zac, having a height Z2 which corresponds to the height of a lower area of exclusion from display of said characteristic symbol in said display window; and
  the reference altitude ALTref, having an altitude ALTref satisfying the relation ALTref=ALTac-Z2, ALTac being said current altitude of the aircraft.

5. The method as claimed in claim 2, wherein, in a flight phase corresponding to a descent phase, step d) includes determining:
  the reference height, having a height Z1 which is the difference between a useful height of said display window and the height of an upper area of exclusion from display of said characteristic symbol in said display window and
  the reference altitude, having an altitude ALTref satisfying the relation ALTref=ALTac-Z 1, ALTac being said current altitude of the aircraft.

6. The method as claimed in claim 1, wherein said particular parameter is the vertical speed of the aircraft.

7. An aircraft, which comprises a device which can implement the method specified in claim 1.

8. A device to assist in piloting of an aircraft in free flight, said device comprising a display unit to show, on at least one display window of at least one display screen of said aircraft, an information presentation which illustrates a vertical plane and which comprises:
  a system of axes, of which a y-axis is graduated altitude-wise, and an x-axis is graduated distance-wise from a position of the aircraft;
  a characteristic symbol representing the aircraft, which is placed on said y-axis in a position representative of an altitude of said aircraft; and
  a trace representing a profile of the ground being flown over and revealing a vertical section, wherein:
  said device also comprises:
  a first determining unit that determines a current flight phase of the aircraft;
  a second determining unit that determines a current altitude of the aircraft;
  a third determining unit that determines a current value of a particular parameter of the aircraft, which illustrates a vertical characteristic of the latter; and
  a fourth determining unit that determines, from said current flight phase, said current altitude and said current value of said particular parameter:
    a reference height corresponding to a height of said characteristic symbol in said display window; and
    a reference altitude corresponding to an altitude of a lowest point of the vertical section displayed; and
  said display unit is formed so as to position:
  said display window altitude-wise such that the lowest point of the vertical section displayed in said display window is located at said reference altitude (ALTref) on said y-axis graduated altitude-wise; and
  said characteristic symbol vertically in said display window at a height corresponding to said reference height wherein the free flight of the aircraft comprises a flight path which is not predetermined.

9. An aircraft, which comprises the device as specified under claim 8.

* * * * *